United States Patent [19]

Mogi

[11] Patent Number: 5,579,983

[45] Date of Patent: Dec. 3, 1996

[54] WELDING APPARATUS

[75] Inventor: Shigeo Mogi, Osaka, Japan

[73] Assignee: Hitachi Zosen Corporation, Japan

[21] Appl. No.: 512,566

[22] Filed: Aug. 8, 1995

[30] Foreign Application Priority Data

Aug. 19, 1994 [JP] Japan .................................. 6-194460

[51] Int. Cl.$^6$ .................................................. B23K 37/02
[52] U.S. Cl. ......................... 228/45; 228/9; 219/125.1; 219/126
[58] Field of Search ........................... 228/8, 9, 25, 45; 219/125.1, 125.11, 126; 29/281.6, 897.35

[56] References Cited

U.S. PATENT DOCUMENTS

| | | | |
|---|---|---|---|
| 3,634,644 | 1/1972 | Ogden et al. | 219/102 |
| 3,748,433 | 7/1973 | Gwin et al. | 228/4.1 |
| 4,436,981 | 3/1984 | Sakamoto et al. | 219/126 |
| 5,443,199 | 8/1995 | Krumszyn et al. | 228/45 |

*Primary Examiner*—Samuel M. Heinrich
*Attorney, Agent, or Firm*—D. Peter Hochberg; Mark Kusner; Michael Jaffe

[57] ABSTRACT

A welding apparatus is provided which includes a rail member 5 installed along a side and a corner portion of a steel frame post, a pinion 46 mounted to a horizontally movable shifting member 50 such that even at the corner portion of the steel frame post 1 the pinion 46 is constantly held in mesh engagement with a rack 6 disposed on a side of the rail member 5, and a position holding roller 57 for guiding the shifting member 50 in a horizontal direction so that the distance between the rack 6 and the pinion 46 is kept constant. During the movement of the carriage, the distance between the rack and the pinion is kept constant to enable welding operations to be performed in succession with respect to side and corner portions of the steel frame post. Therefore, after a face-to-face welding operation at one side is completed, such a welding operation at the other side may be carried out without the necessity of removing the carriage from the rail member. This provides for improvement in operating efficiency, as well as quality improvement and stability with respect to weld work.

5 Claims, 6 Drawing Sheets

WELDING APPARATUS

FIELD OF THE INVENTION

The present invention relates to a welding apparatus for welding a joint for an object to be welded, such as steel frame post.

BACKGROUND OF THE INVENTION

When prismatic steel frame posts are to be welded at a construction site, it is known to carry out so-called face-to-face welding such that opposite faces of the steel frame post are welded at the same time in order to eliminate possible strains due to welding and provide improved accuracy with respect to construction work. In this case, a rail is placed in a given limited space adjacent to the periphery of the steel frame post so that a welding apparatus is guided by the rail for automatic movement thereon. In this way, welding is carried out with respect to a joint for the steel frame post.

When welding a joint for a steel frame post in such a manner, mounting a rail to the steel frame post involves laborious work. Especially where the position of the joint is high (e.g., 1m or more) above the surface on which the steel frame post is erected, the welding work involves greater operational inconvenience and more time and labor. When welding work at one side of the steel frame post has been finished, it may be necessary to weld an adjacent side of the steel frame post. In that case, the rail which has been placed at the one side must be removed and placed anew at the adjacent other side, which is very troublesome. Furthermore, welding with respect to any corner portion of the steel frame post must be carried out separately from the welding work at the one and/or the other side. This naturally results in reduced welding efficiency.

Therefore, it is a primary object of the present invention to provide a welding apparatus which eliminates the above mentioned problems.

DISCLOSURE OF THE INVENTION

A welding apparatus in accordance with the present invention includes a rail member disposed in a horizontal plane extending along a side and a corner portion of a prismatic object to be welded, a carriage movable along the rail member, and a welding unit mounted on the carriage for welding the object to be welded. The carriage is provided at its front and rear portions with guide members which are guided by guide faces of the rail member. A shifting member movable within a horizontal plane rectangular to the rail member is mounted to the carriage and has a pinion mounted thereto through a rotary shaft which is rotatable in mesh engagement with a rack mounted to a side of the rail member. The shifting member carries a driving motor for driving the pinion. Mounted also to the shifting member is a position holding member for constantly keeping the shifting member in position at the rail member side and also for constantly keeping the pinion in mesh engagement with the rack during the movement of the carriage along the object to be welded.

A welding unit for welding the object to be welded is swivellably mounted through a swivel slide on the carriage which is movable on and along the rail member laid along the side and corner portions of the object to be welded, The swivel axis of the swivel slide is positioned on a vertical line passing through centers of, or points adjacent to the centers of, the guide members which are disposed at front and rear portions of the carriage for holding the rail member at upper and lower portions thereof.

According to the above arrangement, when the driving motor is driven, the driving force of the driving motor is transmitted to the pinion so that the pinion is caused to rotate in mesh engagement with the rack mounted to the rail member. Thus, the carriage goes into movement. When the carriage reaches a corner portion past a side of the prismatic object to be welded after its movement along the side of the object, the shifting member is allowed to move in a horizontal plane rectangular to the rail member under the action of the position holding member which moves along the rail member. The pinion mounted to the shifting member moves in conjunction with the shifting member within a horizontal plane rectangular to the rail member and keeps itself in rotation with a given spacing held in relation to the rail member side. Therefore, the pinion is constantly held in rotation in mesh contact with the rack, and this enables the carriage to move along the corner of the steel frame post.

As is apparent from the above description, according to the arrangement of the invention, the carriage loaded with the welding unit is allowed to smoothly run along the rail member. Therefore, after completion of a face-to-face welding at one side of the object to be welded, if such welding is required at the other side of the object, the required welding operation at the other side can be performed in succession. Thus, according to the invention, it is possible to reduce dependence upon the operator in welding operations.

Furthermore, the swivel axis of the swivel slide on which is mounted the welding unit is positioned on a vertical line passing through centers of the guide members which are arranged at front and rear portions of the carriage for holding the carriage at upper and lower portions thereof. Therefore, when corner portions of the steel frame post are to be welded, the front end portion (welding torch) of the welding unit can be readily controlled so as for it to orient in a direction normal to the corner portion of the steel frame post while being kept in a predetermined welding position relative to the corner portion.

DESCRIPTION OF THE PREFERRED EMBODIMENT

Figure 1:
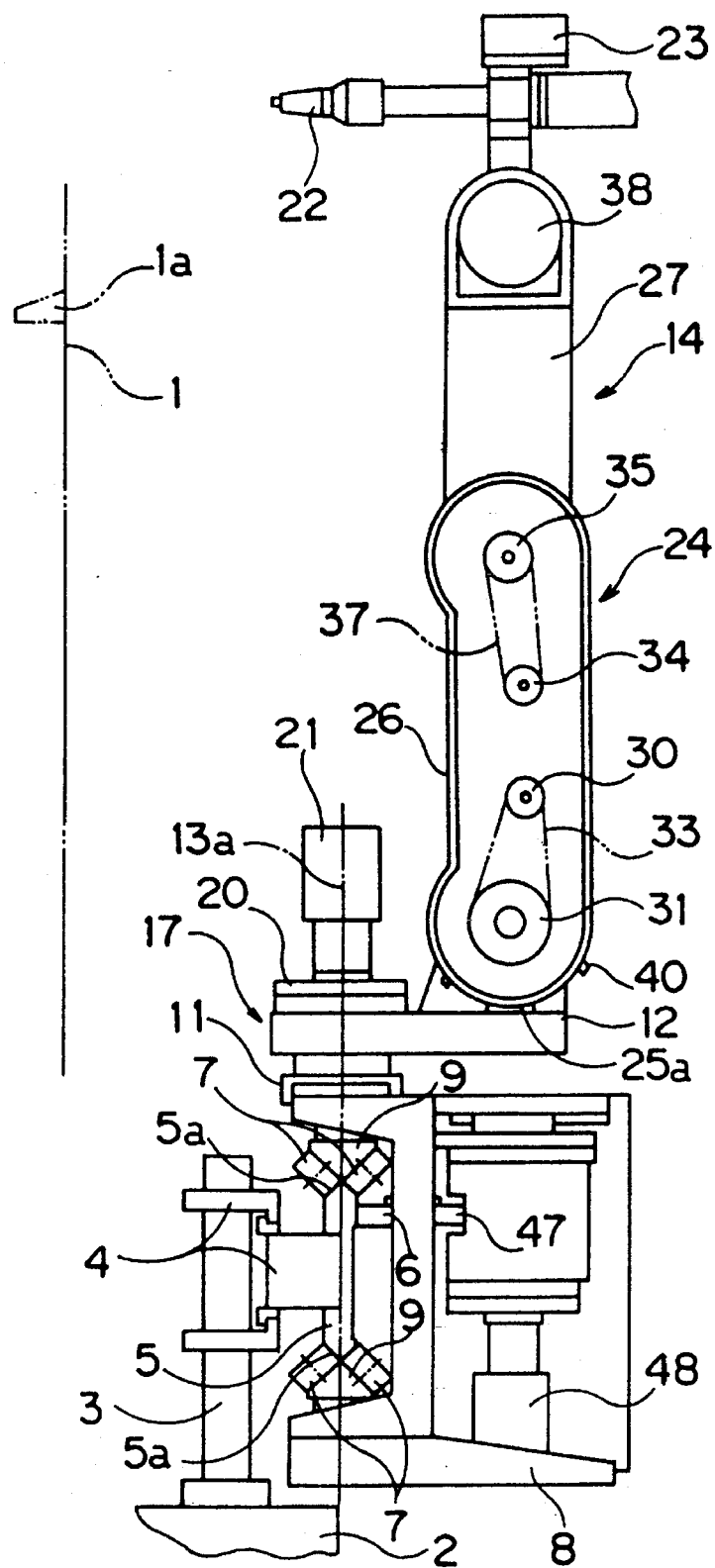
FIG. 1 is a general front view of a welding apparatus representing one embodiment of the present invention.

One embodiment of the present invention will now be described with reference to the accompanying drawings 1 through 6.

The welding apparatus embodying the invention is intended for use at a construction site in welding a joint 1a for a prismatic object to be welded (hereinafter referred to as steel frame post) 1. As can be seen from the general front view of FIG. 1 and sectional view of FIG. 2, the welding apparatus includes a setting base 2 placed adjacent an outer side of the steel frame post 1, a mounting support post 3 on the setting base 2, and a tabular rail member 5 mounted to the mounting support post 3 through a mounting member 4 along a side and corners of the steel frame post 1. The upper and lower ends of the rail member 5 is each chamfered to form a triangular guide face 5a, and the rail member 5 has a rack 6 attached to an upper portion thereof at a side.

Figure 2:
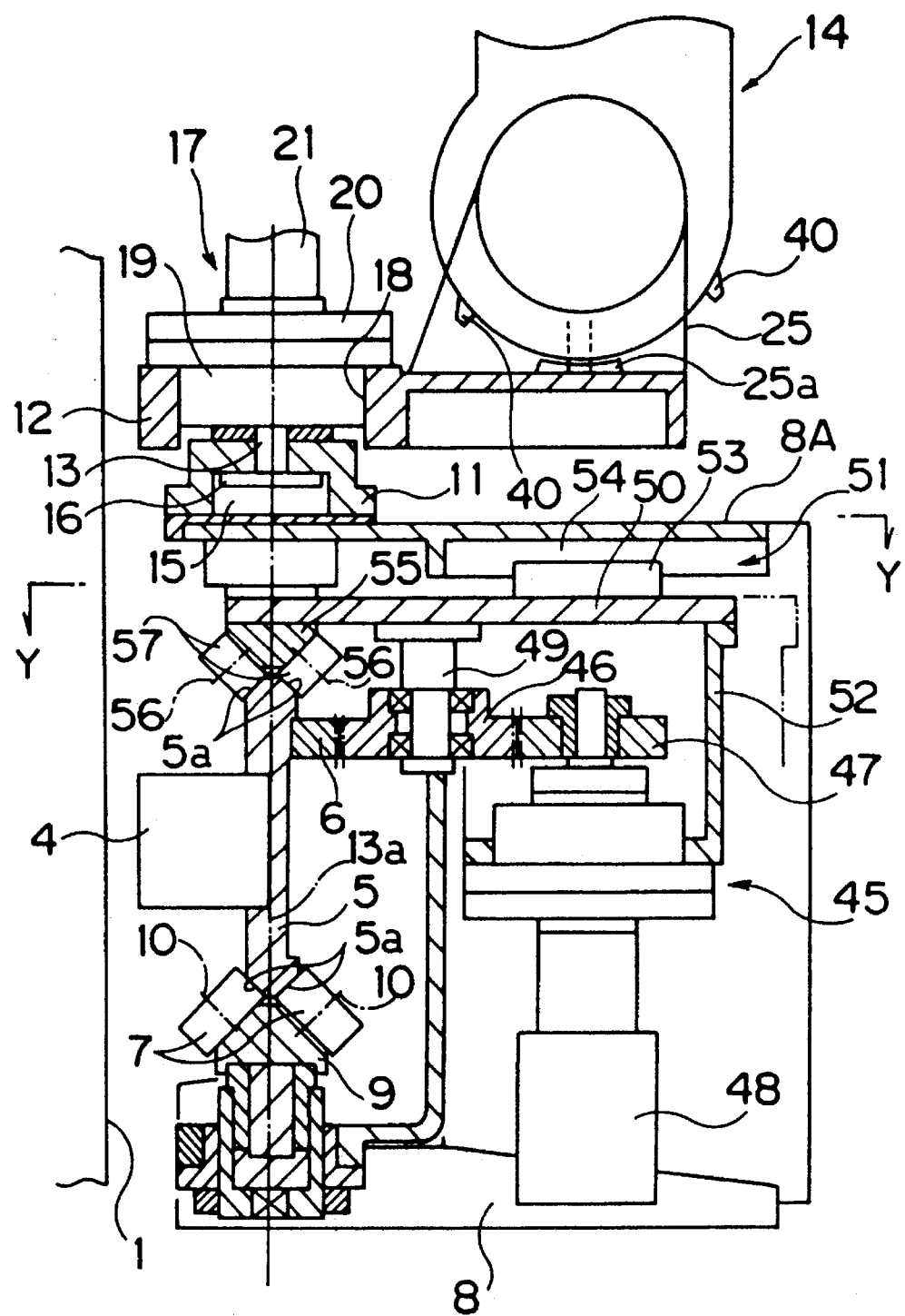
FIG. 2 is an enlarged sectional view showing main portions of one embodiment of the invention.
Figure 3:
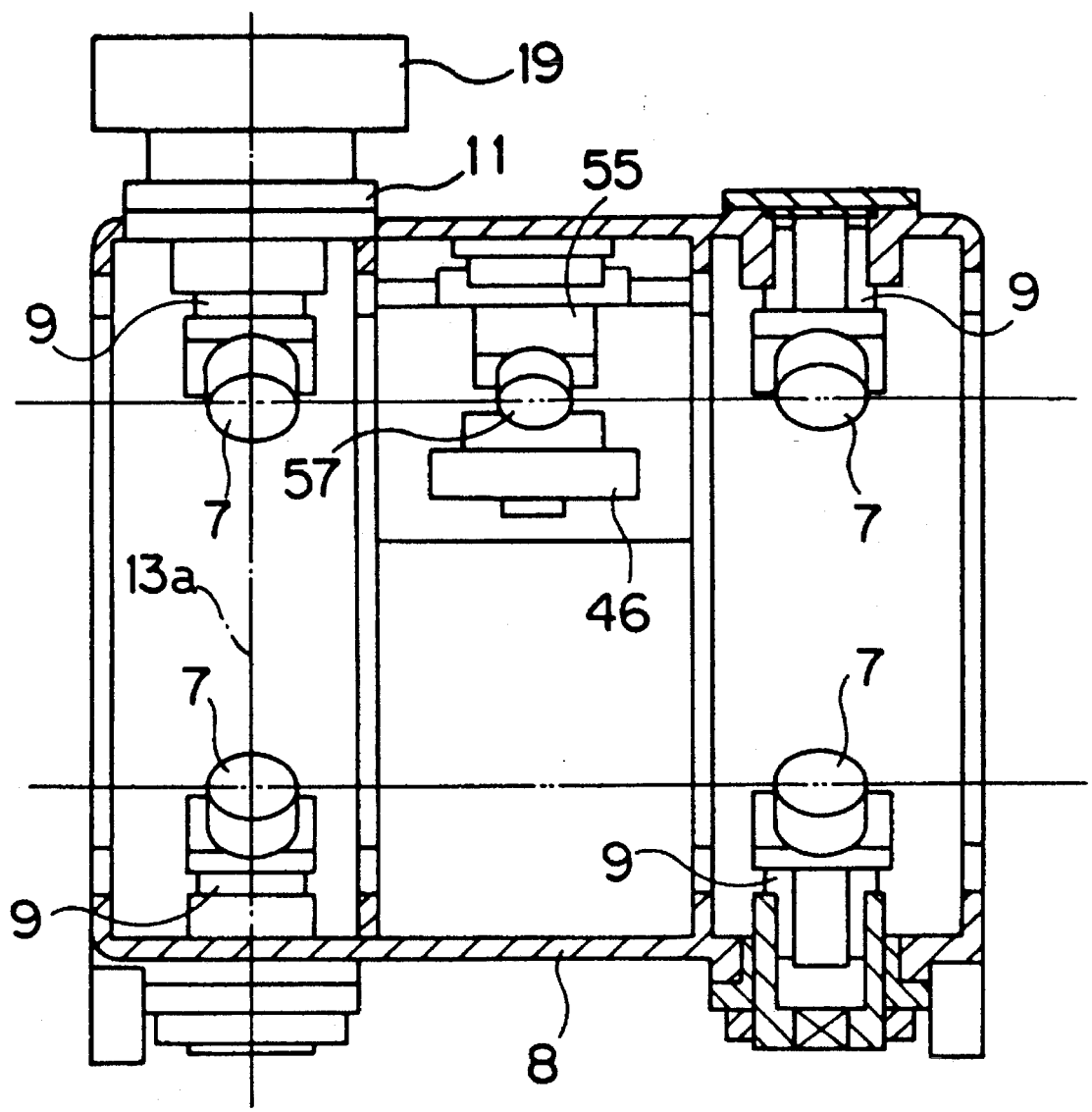
FIG. 3 is an enlarged vertical sectional view showing a mobile unit in one embodiment of the invention.

A carriage 8 movable along the rail member 5 is mounted on the rail member 5 through upper and lower guide rollers (which guide rollers represent one example of guide members) 7 movable in rolling contact with the guide faces 5a of the rail member 5. As FIGS. 2 and 3 show in section, the guide rollers 7 are carried by the carriage 8 in front and rear pairs, each pair right and left, are each rotatably supported on an oblique shaft 10 through a support member 9.

A swivel slide 12 is mounted on the top of the carriage 8 through a mounting block 11. The swivel slide 12 is swivellably supported on a turning shaft 13 extending through the mounting block 11 upwardly from a recessed underside portion 15 thereof. A welding unit 14 for welding joint 1a of steel frame post 1 is mounted on the swivel slide 12. The swivel axis 13a of the turning shaft 13 is positioned on a vertical line passing through the centers of the upper and lower guide rollers 7. The turning shaft 13 has a large diameter portion 16 formed at its lower end which abuts the bottom of the recessed underside portion 15.

On the top of the turning shaft 13 there is mounted a swivel means 17 for swivelling the swivel slide 12 about the turning shaft 13. The swivel means 17 consists of the swivel slide 12, a turning disc 19 fitted in a mounting hole 18 formed in the swivel slide 12, and a swivel motor 21 mounted to the swivel slide 12 through a mounting plate 20 at a location above the turning disc 19. The swivel motor 21 has its output shaft connected to the turning disc 19. When the swivel motor 21 is driven, the swivel motor 21 itself and the turning disc 19 go into swivel movement so that the swivel slide 12 to which the swivel motor 21 is mounted is caused to swivel about the turning shaft 13.

Figure 4:
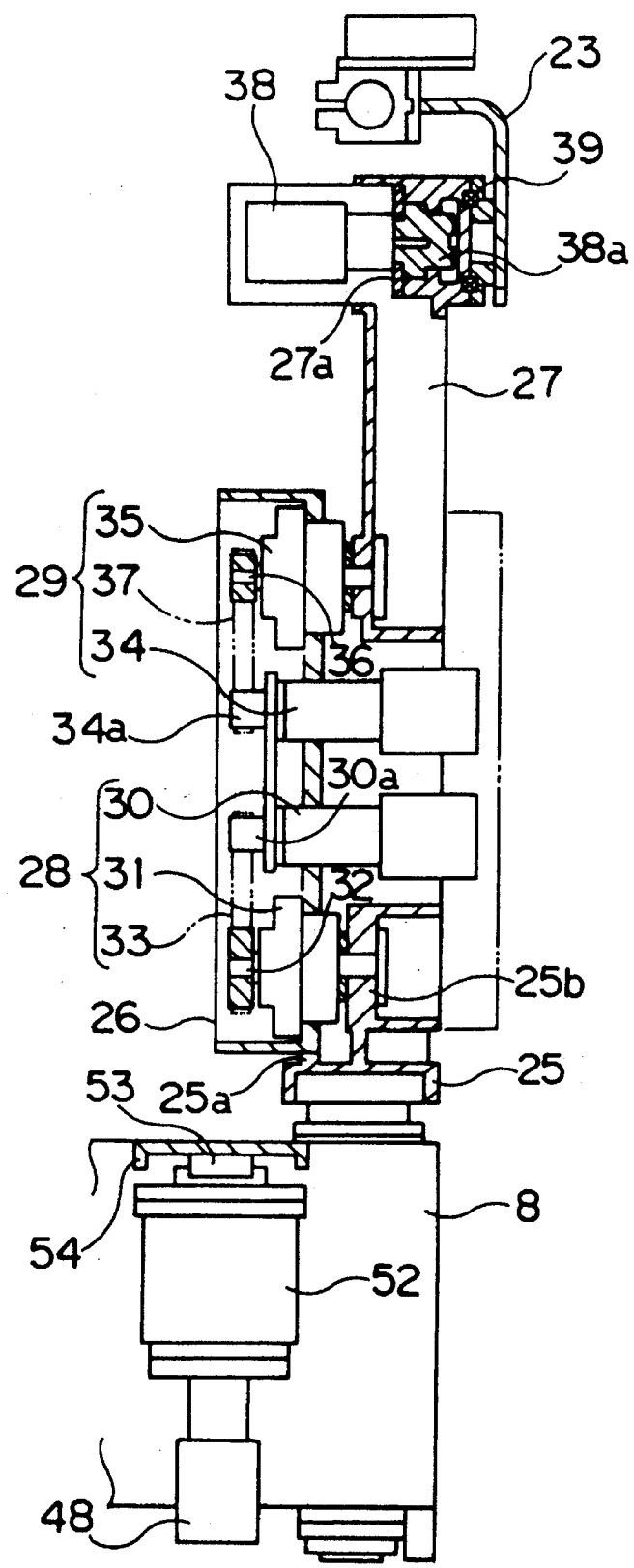
FIG. 4 is an enlarged sectional view showing the welding apparatus according to one embodiment of the invention.
Figure 5:
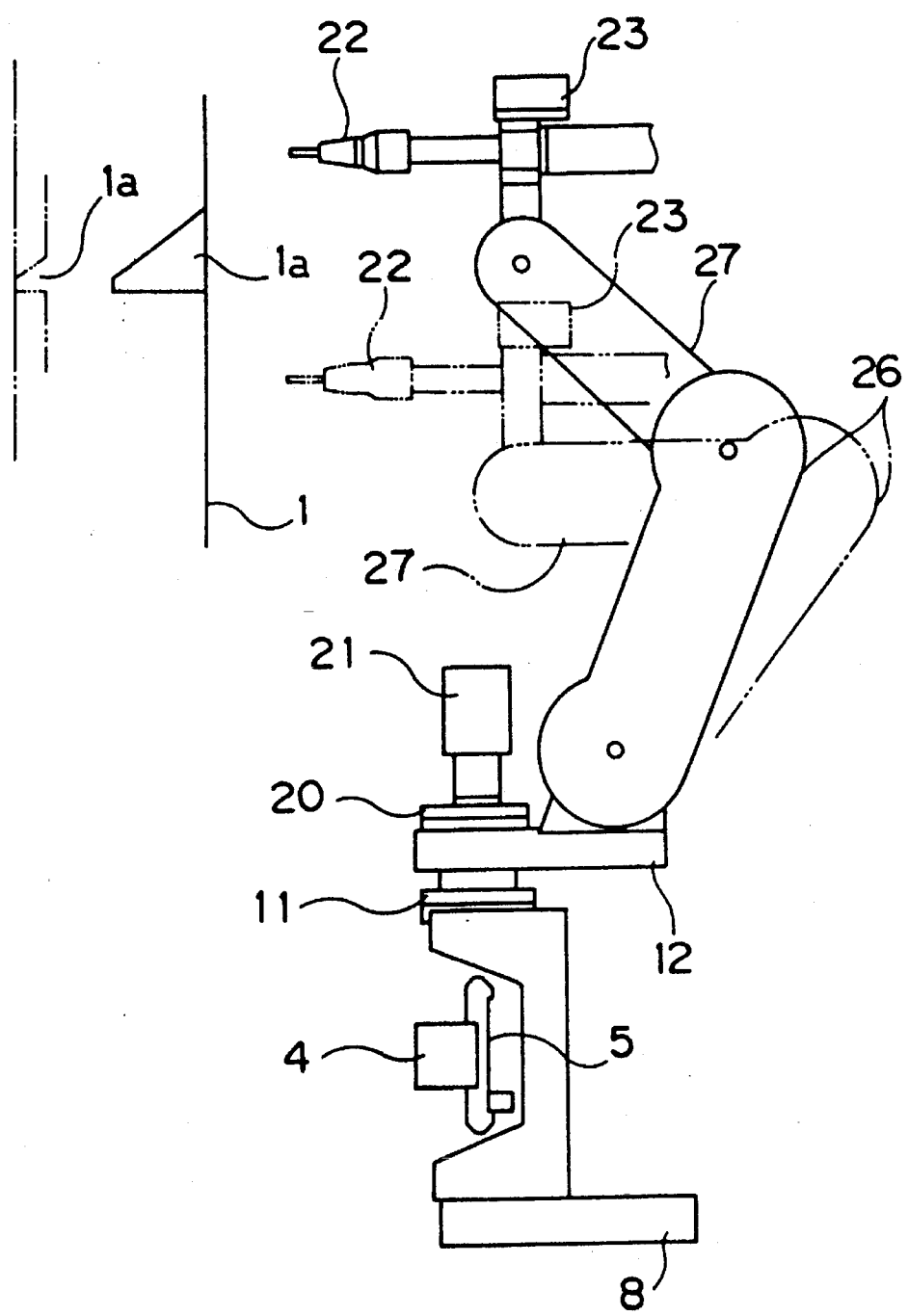
FIG. 5 is a front view showing an arm device, in folded and unfolded conditions, of the welding apparatus according to one embodiment of the invention.

As FIGS. 1 and 4 show, the welding unit 14 comprises an arm device 24 mounted to a bracket 25 erected upright on the top of the swivel slide 12, and a welding torch 22 attached to the upper end of the arm device 24 through the intermediary of a handle member 23. The arm device 24 is adapted to move the welding torch 22 toward and away from the joint 1a of the steel frame post 1 and comprises a first arm member 26 slidably supported by the bracket 25, a second arm member 27 flexibly attached to the upper end of the first arm member 26, a first pivot means 28 for pivoting the first arm member 20 relative to the bracket 25, and a second pivot means 29 for pivoting the second arm member 27 relative to the first arm member 26.

As FIG. 4 illustrates, the first pivot means 28 comprises a first pivoting motor 30 mounted horizontally to the first arm member 26 at a midpoint thereof, a first reduction gear 31 disposed horizontally on the first arm member 26 at a site lower than the first pivoting motor 30, and a belt 33 interconnecting a motor shaft 30a of the first pivot motor 30 and a reduction shaft 32 of the first reduction gear 31 at respective one end thereof.

The second pivot means 29 comprises a second pivot motor 34 mounted horizontally to the first arm member 26 at a site above the first pivot motor 30, a second reduction gear 35 mounted horizontally to the first arm member 26 at a site above the second pivot motor 34, and a belt interconnecting a motor shaft 34a of the second pivot motor 34 and a reduction shaft 36 of the second reduction gear 35 at respective one end thereof.

The other end of the reduction shaft 32 of the first reduction gear 31 extends through and is supported by an upright support portion of the bracket 25, and the other end of the reduction shaft 36 of the second reduction gear 35 extends through and is supported by a lower portion of the second arm member 27. When the first pivot motor 30 is driven, the driving force is transmitted to the first reduction gear 31 so that the first reduction gear 31 itself goes into rotation which in turn causes the first arm member 26 to turn about the reduction shaft 32 of the first reduction gear 31. Likewise, when the second pivot motor 34 is driven, the driving force is transmitted to the second reduction gear 35 so that the second reduction gear 35 itself goes into rotation which in turn causes the second arm member 27 to turn about the reduction shaft 36 of the second reduction gear 35.

The second arm member 27 has a mounting piece 27a formed at its upper end to which is mounted a handle-member pivot motor 38 for pivoting the handle member 23 within a vertical plane. The handle member 23 is attached to a motor shaft 38a of the handle-member pivot motor 38 through a bearing 39.

At a lower end of the first arm member 26, as FIG. 2 shows, there is provided a pair of stoppers 40 which goes in contact with an upward protrusion 25a formed on the swivel slide 12 to regulate the pivoting range of the first arm member 26.

Figure 6:
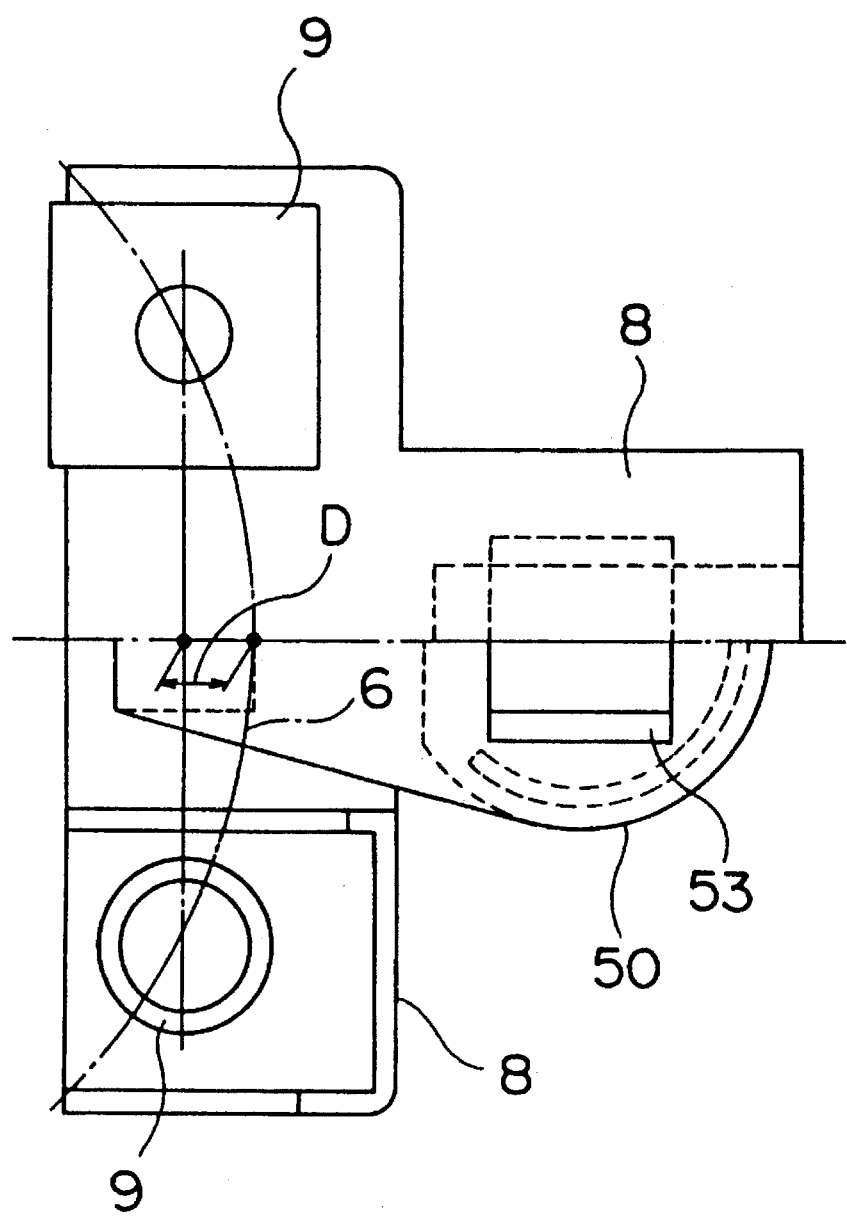
FIG. 6 is a view taken in the direction of the arrows on the line Y—Y in FIG. 2.

A shifting member 50 is provided in the interior of the carriage 8 as shown in FIGS. 2 and 6. This shifting member 50 is adapted to move within a horizontal plane rectangular to the rail member 5 under the guide of a guide means 51, as shown in phantom in FIG. 2.

The guide means 51 comprise a slider 53 formed on the shifting member 50 at one side thereof and adapted to slide along a guide member 54 formed on the underside of an upper bed 8A of the carriage 8, and a position holding roller (one example of position holding member) 57 supported through a support member 55 on the underside of the shifting member 50 at the other side end portion thereof for rotation about an oblique shaft 56. As FIG. 3 shows, the position holding roller 57 is disposed between front and rear guide rollers 7 for rolling contact with the guide face 5a of the rail member 5 so that during the movement of the carriage 8 it is guided by being constantly held in contact with the guide face 5a of the rail member 5. The position holding roller 57, carried by the shifting member 50, serves to shift the shifting member 50 in a horizontal direction when the carriage 8 approaches an arcuate portion of the rail member 5, as shown in FIG. 6.

A drive mechanism 45 for moving the carriage 8 along the rail member 5 is provided in the shifting member 50. The drive mechanism 45 comprises a pinion 46 rotatably supported on a vertically extending rotary shaft 49 mounted to the underside of the shifting member 50, the pinion 46 being held in mesh engagement with the rack 6 for rotation, a drive pinion 47 mesh-engageable with the pinion 46 for rotating the same, and a drive motor 48 mounted to the shifting member 50 through a mounting member 62, with the drive pinion 47 being mounted thereto.

According to the foregoing arrangement, when the drive motor 48 is driven, the driving force of the drive motor 48 is transmitted to the pinion 46 through the drive pinion 47 for rotating the pinion 46, whereby the guide rollers 7 are guided by the guide faces 5a of the rail member 5 so that the carriage 8 can move adjacent the steel frame post 1.

Whilst, in the welding unit 14, the first pivot motor 30, second pivot motor 34, and handle-member pivot motor 38 may be driven as required in order to pivot the first arm member 26, second arm member 27, and handle member 23 within a vertical plane, so that the welding torch 22 can be brought close to the joint 1a of the steel frame post 1 for face-to-face welding in relation to the joint 1a of the steel frame post 1.

The rail member 5 is laid in such a way that at a point where it reaches a corner portion past a straight portion of the steel frame post 1, the rail member 5 extends in an arcuate fashion along the corner portion of the steel frame post 1. The rack disposed along a side of the rail member 5 is also of arcuate configuration. Therefore, the median portion of the arcuate rack 6 shown in FIG. 6 is at a position offset horizontally outward by a given distance D in relation to a straight line extending between the two guide rollers 7 (there is no such deviation in case that the rail member 5 is straight). In this way, when the carriage approaches the arcuate portion of the rail 5 past the straight portion, it is necessary that the pinion 46 be brought into mesh engagement with the rack 6 which is offset the given distance D.

As FIG. 6 illustrates, when the carriage 8 approaches the arcuate portion of the rail member 5, the position holding roller 57 causes the shifting member 50 to move outward to a position shown in phantom in FIG. 2 (in which case the distance of movement is identical with the distance D in FIG. 6). The pinion 46, which is rotatably supported by the shifting member 50 through the rotary shaft 49, also shifts the same distance as the distance D shown in FIG. 6 so that it is constantly held in mesh engagement with the rack 6 mounted to a side of the rail member 5.

Therefore, even when the carriage 8 reaches a corner portion of the steel frame post 1 past a straight portion, it is possible to avoid any such trouble that the pinion 46 bites into the rack 6 so that the carriage 8 may no longer continue to run. Thus, the carriage 8 is allowed to smoothly run along the rail member 5.

When the carriage 8 reaches a corner portion of the steel frame post 1, the operation of the welding unit 14 is performed in such a way that the swivel motor 21 is driven to swivel the swivel slide 12 about the turning shaft 13 as required so as to constantly orient the front end portion of the welding unit 14 in a direction normal to the corner portion of the steel frame post 1.

When, after further run of the carriage 8, the carriage 8 is going to return from the corner portion of the steel frame post 1 to the straight portion, the shifting member 50 follows the position holding roller 57 to return to its original position, and accordingly the pinion 46 mounted to the shifting member 50 also returns to its original position. Therefore, the distance between the rack 6 and the pinion 46 is kept always constant without the rack 6 being allowed to be away from the pinion 46, so that the pinion 46 is constantly kept in mesh engagement with the rack 6, it being thus possible to allow the carriage 8 to run along the rail member 5.

As described above, according to the present invention, the rail member 5 is installed along a side and a corner portion of the steel frame post 1, with a rack 6 mounted to the rail member 5, and the pinion 46 rotates in a horizontal direction while in mesh engagement with the rack 6. Through such movement of the pinion 46, the carriage 8, equipped with the welding unit 14, is allowed to smoothly run along the rail member 5. Even at a corner portion of the steel frame post 1, the pinion 46 is constantly held in mesh engagement with the rack 6.

Since the carriage 8 can run along the corner portion of the steel frame post 1, therefore, in case that, after completion of a face-to-face welding operation at one side, a face-to-face welding operation is to be carried out at the other side, the carriage 8 need not be removed from the rail member 5 and the face-to-face welding operation at the other side may be carried out in succession. The arrangement of the invention is less dependent on the operator and provides for improvement in operating efficiency. Moreover, since face-to-face welding can be performed without the necessity of removing the carriage 8 from the rail member 5, the arrangement enables improvement in weld quality.

Furthermore, the swivel axis 13a of the swivel slide 12 on which the welding unit 14 is mounted is positioned on a vertical line passing the centers of the guide rollers 7. Therefore, when welding a corner portion of steel frame post 1, the front end portion (welding torch 22) of the welding unit 14 can be easily controlled to become oriented in a direction normal to the corner of the steel frame post 1 while being maintained at a predetermined welding position.

In the foregoing embodiment, the carriage 8 is mounted on the rail member 5 through guide rollers 7 by which the carriage 8 is guided, and the position holding roller 57 disposed between the guide rollers 7 is mounted to the shifting member 50. It is understood, however, that the present invention is in no way limited to this arrangement. For example, instead of the guide rollers 7 and position holding roller 57, slider members adapted to slide along the guide faces 5a of the rail member 5 may be mounted to the carriage 8 so that the carriage 8 will run along the rail member 5 through slide movement of the slider members on and along the guide faces 5a of the rail member 5. In this case, too, the invention can exhibit same functions and advantages as those in the above described embodiment.

What is claimed is:

1. A welding apparatus for welding a joint for a prismatic object to be welded, such as steel frame post, comprising a rail member installed within a horizontal plane extending along a side and a corner portion of the prismatic object to be welded, a carriage mounted on the rail member for movement along the rail member, a welding unit mounted on the carriage for welding the object to be welded, a guide member disposed on the carriage and adapted to hold the carriage at upper and lower portions thereof for being guided by guide faces of the rail member, a shifting member mounted to the carriage for movement within a plane rectangular to the rail member, a pinion mounted to the shifting member through a rotary shaft and rotatable in mesh engagement with a rack mounted to a side of the rail member, a driving motor mounted to the shifting member for driving the pinion, and a position holding member mounted to the shifting member and adapted to be slidingly guided by the guide faces of the rail member for holding the shifting member in position at the rail member side during movement of the carriage along the object to be welded, thereby causing the pinion to be constantly held in mesh engagement with the rack.

2. A welding apparatus as defined in claim 1, wherein the guide member is a guide roller.

3. A welding apparatus as defined in claim 2, wherein the rail member is chamfered at upper and lower ends thereof to define a triangular guide face by which the guide roller is guided.

4. A welding apparatus as defined in claim 1, wherein the position holding member is a position holding roller.

5. A welding apparatus as defined in claim 1, wherein the welding unit for welding the object to be welded is swivellably mounted on the carriage through the intermediary of a swivel slide, the swivel axis of the swivel slide being positioned on a vertical line passing the center of, or an adjacent point to, the guide member which is disposed on the carriage for holding the rail member at the upper and lower portions thereof.

* * * * *